Dec. 31, 1940.  E. FISCHEL  2,226,902
DAMPING MEANS FOR INDICATING INSTRUMENTS
Filed April 11, 1939
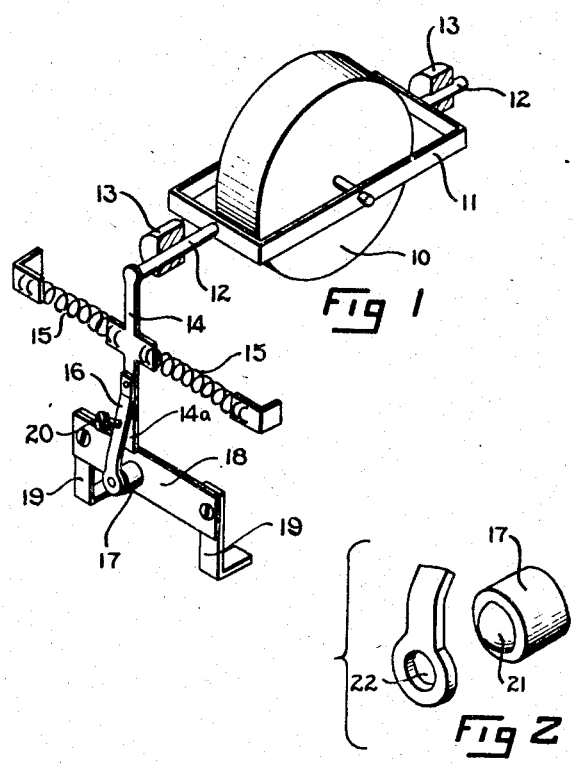
Fig 1
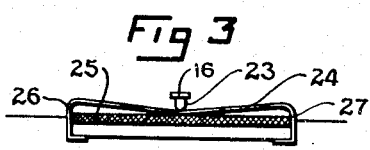
Fig 2
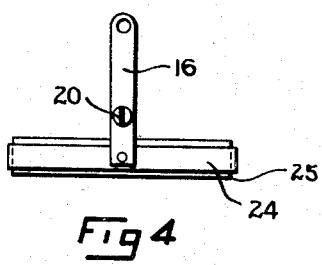
Fig 3
Fig 4
INVENTOR
Eduard Fischel
BY
Stephen Cerstvik
ATTORNEY

UNITED STATES PATENT OFFICE 2,226,902

DAMPING MEANS FOR INDICATING INSTRUMENTS

Eduard Fischel, Berlin-Charlottenburg, Germany, assignor to Siemens Apparate und Maschinen Gesellschaft mit beschrankter Haftung, Berlin, Germany, a corporation of Germany Application April 11, 1939, Serial No. 267,350
In Germany April 14, 1938

1 Claim. (Cl. 74—5)

This invention relates to damping means, and more particularly to damping means for measuring, indicating or control instruments.

One of the objects of the present invention is to provide novel damping means which are simple and light in construction and inexpensive to manufacture.

Another object of the invention is to provide novel means of the above character which function with uniformity and which will not reduce the accuracy of an apparatus to which it is operatively connected.

Another object is to provide novel damping means for measuring, indicating or control instruments, the latter having a movable member to be damped which is in constant vibration.

A further object of the invention is to provide novel damping means which concurrently act as electric control means.

The above and further objects and novel features will more fully appear from the detailed description when the same is read in connection with the accompanying drawing. It is to be expressly understood, however, that the drawing is for purposes of illustration only and is not intended as a definition of the limits of the invention, reference for this latter purpose being had to the appended claim.

In the drawing, wherein like reference characters refer to like parts throughout the several views, Fig. 1 is a perspective view of one embodiment of the invention;

Fig. 2 is a detail view of a portion of Fig. 1;

Fig. 3 is a bottom view of a damping arrangement comprising a second embodiment of the invention; and, Fig. 4 is a side elevation of the parts shown in Fig. 3.

In the form shown in Fig. 1, the apparatus is employed for damping the movements of a control system comprising a measuring device, for example a turn indicator for an aircraft, which is constituted by a gyro rotor 10 in gimbal frame suspension. The gimbal frame suspension is constituted by a frame 11 having trunnions 12, the coincident axes of which are perpendicular to the axis of rotation of rotor 10. Trunnions 12 are rotatably mounted in fixed bearings 13.

Suitable means are provided for damping any oscillatory movement of the gyro, comprising two members which frictionally engage one another, the first member, for example, being constituted by an arm 14 which is rigidly attached to one of the trunnions 12, the latter being normally retained in a central position by means of resilient spring members 15. Arm 14 is provided, adjacent the free extremity thereof, with a leaf or laminated spring 16 with which is associated, in a manner to appear later, a cap-shaped friction member 17 which engages a second friction member 18 under the pressure of spring 16. Member 18, in the embodiment illustrated, is fixedly mounted relative to arm 14, for example by brackets 19, which are secured to the craft. In order to regulate the intensity of the frictional engagement between members 17 and 18, a set screw 20 is provided within leaf spring 16 which passes therethrough and engages a depending portion 14a of the arm 14.

For the purpose of bringing about a uniform pressure of the member 17 against member 18, the first-named member is associated with leaf spring 16 by means of a ball and socket joint comprising, in the form shown in Fig. 2, a ball 21 which engages a perforation 22 at the extremity of said spring, ball 21 being attached to member 17 which is tubular in form.

In order that an instrument of the above character may govern a control magnitude, for example, an electric current, suitable current control means can be employed therewith comprising, for example, an electric resistance element with which is associated a sliding member or contact arm. Such a resistance and sliding contact can be used in the present invention not only as a current control device but also as a damper. In the form shown in Fig. 3, a first friction member comprises a sliding resistance contact 23 which is preferably rigidly attached to leaf spring 16, and which frictionally engages an elastic or yielding strip 24 of high conductivity. Strip 24 is stretched above a high ohmic resistance 25 between arms 26, 27 and is pressed into contact with the resistance by the pressure of spring 16. Resistance 25 may be constituted by a graphite or carbon layer. The friction resulting from the movement of the sliding contact 23 on the resistance member serves in a manner analogous to that above described for damping the control instrument.

There is thus provided a novel damping device which is easily adapted for use in combination with a wide variety of apparatus, in particular measuring or indicating devices, wherein a damping action is needed for some member thereof.

Although only two embodiments of the invention have been illustrated and described in detail, it is to be expressly understood that the same is not limited thereto; for example, the two friction members may be of any desired form. Various changes may be made in the design and arrangement of the parts without departing from the spirit and scope of the invention, as the same will now be understood by those skilled in the art. For a definition of the limits of the invention, reference will be had primarily to the appended claim.

What is claimed is:

A rate of turn responsive gyroscope for an aircraft, comprising a rotor, a gimbal mounting said rotor for spinning about a horizontal axis, said gimbal being mounted for angular movement about a second axis perpendicular to the first axis, means yieldingly opposing the angular movement of said gimbal about said second axis whereby the angle of movement is a function of the rate of turn of said aircraft, an arm included in said yieldingly opposing means connected with said gimbal at the axis of movement of said gimbal for angular movement therewith, a first friction member, a stationary friction member, and resilient means connecting said first friction member to said arm for angular movement therewith and yieldingly urging said first friction member against said stationary friction member for frictional sliding angular movement thereover during angular movement of said gimbal.

EDUARD FISCHEL.